United States Patent
Strom

(10) Patent No.: US 8,197,161 B2
(45) Date of Patent: Jun. 12, 2012

(54) CHIP-REMOVING TOOL

(75) Inventor: Rudolf Strom, Vaihingen/Enz (DE)

(73) Assignee: Mapal Fabrik fur Prazisionswerkzeuge Dr. Kress KG (DE)

( * ) Notice: Subject to any disclaimer, the term of this patent is extended or adjusted under 35 U.S.C. 154(b) by 319 days.

(21) Appl. No.: 12/673,817

(22) PCT Filed: Aug. 22, 2008

(86) PCT No.: PCT/EP2008/006900
§ 371 (c)(1),
(2), (4) Date: Feb. 17, 2010

(87) PCT Pub. No.: WO2009/030378
PCT Pub. Date: Mar. 12, 2009

(65) Prior Publication Data
US 2011/0103906 A1 May 5, 2011

(30) Foreign Application Priority Data

Aug. 30, 2007 (DE) .......................... 10 2007 040 936

(51) Int. Cl.
*B23B 27/00* (2006.01)
*B23B 27/22* (2006.01)

(52) U.S. Cl. ............................................ 407/87; 407/41
(58) Field of Classification Search ................ 407/87, 407/91, 109, 108, 94, 41, 49, 50
See application file for complete search history.

(56) References Cited

FOREIGN PATENT DOCUMENTS

| DE | 39 36 243 A1 | 5/1991 |
|---|---|---|
| DE | 292 402 A5 | 8/1991 |
| DE | 92 04 587 U1 | 7/1992 |
| EP | 1 314 503 A | 5/2003 |
| WO | WO 02/00382 A | 1/2002 |

OTHER PUBLICATIONS

International Search Report dated Jan. 13, 2009, issued in corresponding international application No. PCT/EP2008/006900.

*Primary Examiner* — Will Fridie, Jr.
(74) *Attorney, Agent, or Firm* — Ostrolenk Faber LLP

(57) ABSTRACT

A chip-removing tool, includes a basic body, at least one cutting body attachable to the basic body and having at least one geometrically defined cutting edge. An adjusting device has an adjusting element expandable by an adjusting screw. The adjusting element is a slotted ring which is supported, on the one hand, on the cutting body and, on the other hand, on the basic body of the chip-removing tool.

17 Claims, 4 Drawing Sheets

CHIP-REMOVING TOOL

CROSS REFERENCE TO RELATED APPLICATION

The present application is a 35 U.S.C. §§371 national phase conversion of PCT/EP2008/006900, filed Aug. 22, 2008, which claims priority of German Application No. 10 2007 040 936.4, filed Aug. 30, 2007, the disclosure of which is incorporated by reference herein. The PCT International Application was published in the German language.

BACKGROUND OF THE INVENTION

The invention relates to a chip-removing tool.

Chip-removing tools of the type referred to here are known. They have a basic body with at least one cutting body which is fastened thereto and which comprises at least one geometrically defined cutting edge. An adjusting device makes it possible to set the exact position of the cutting edge. It became apparent that known adjusting devices require a relatively large construction space which weakens the basic body of the tool.

SUMMARY OF THE INVENTION

The object of the invention, therefore, is to provide a chip-removing tool which avoids the above disadvantage and in which the adjusting device requires a very small construction space.

To achieve this object, a chip-removing tool is proposed which comprises the features mentioned below. It therefore has a basic body, a cutting body having at least one geometrically defined cutting edge, and an adjusting device with an adjusting element which can be expanded by means of an adjusting screw. This it possible for the at least one cutting edge to be set. The chip-removing tool is distinguished in that the adjusting element of the adjusting device is designed as a ring which is supported, on the one hand, on the cutting body and, on the other hand, on the basic body of the chip-removing tool. The ring can be designed to be thin, without functional disadvantages occurring, so that, when the at least one geometrically defined cutting edge is being set, little effort is needed for expanding the adjusting element of the adjusting device, and only a very small construction space is required.

An especially preferred exemplary embodiment of the chip-removing tool is distinguished in that the adjusting element, designed as a ring, of the adjusting device has a slot. It can therefore be widened with relatively little force, in order to set the position of a knife plate of the chip-removing tool.

An especially preferred exemplary embodiment of the chip-removing tool is distinguished in that the cutting body is designed as a knife plate, and in that the thickness of the ring is at most as large as the thickness of the knife plate. On account of the small construction space of an adjusting device of this type, the chip-removing tool is weakened to only a very little extent, thus resulting in high functional reliability.

BRIEF DESCRIPTION OF THE DRAWINGS

The invention is explained in more detail below with reference to the drawings in which:

FIG. 3d, sectional view; and FIG. 3e, perspective view.

DESCRIPTION OF A PREFERRED EMBODIMENT

Figure 1:
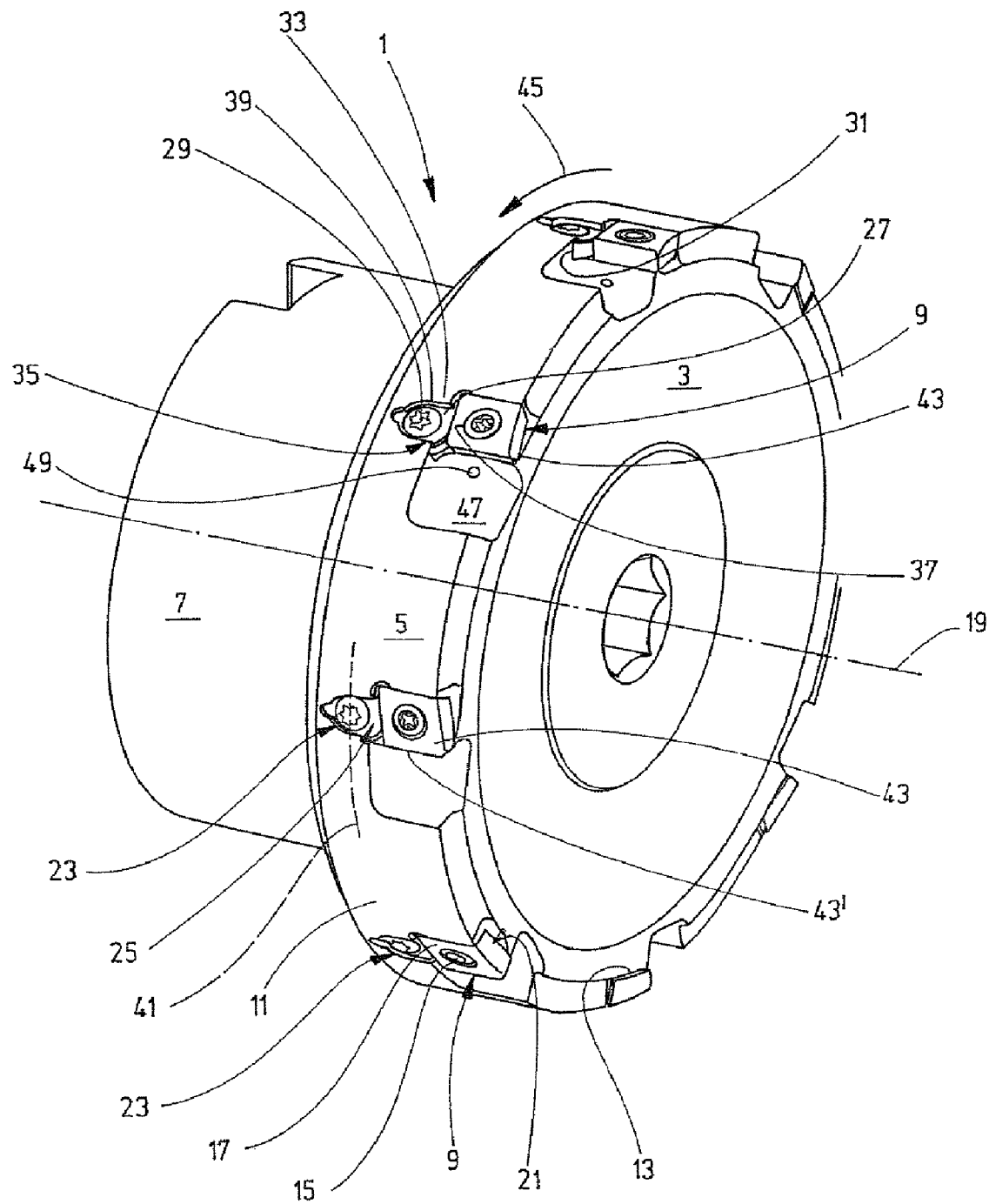
FIG. 1 shows a perspective front view of a chip-removing tool.

The chip-removing tool 1 illustrated in FIG. 1 is designed, for example, as a surface milling cutter. It is reproduced in a perspective illustration, so that its front side and also its circumferential face can be seen. The chip-removing tool, designated below briefly as the tool 1, has here a shank 7 which serves for connecting the tool to a machine tool, directly or via an intermediate piece, an adaptor or the like.

The tool 1 has at least one cutting body designed here as a knife plate 9. The exemplary embodiment reproduced here is provided with eight identical knife plates 9 which are fastened to the basic body 11 of the tool 1. Here, each knife plate is accommodated in a suitable recess 13 and is fastened tangentially to the tool 1 by means of a tension screw 15. The screw penetrates perpendicularly through the knife plate 9, that is, the axis of rotation, not reproduced here, of the tension screw 15 stands perpendicularly to the mid-axis 19 of the tool 1 which also constitutes the axis of rotation of the tool. The tension screw 15 also stands perpendicularly on the base 21 of the recess 13 on which the knife plate 9 lies. That the knife plate 9 is arranged virtually tangentially with respect to the circumferential face 5 of the tool 1 is therefore confirmed.

All the knife plates of the tool 1 are designed identically, as are the recesses 13 for the knife plates 9. The explanations therefore apply to all the knife plates of the tool 1.

Figure 3:
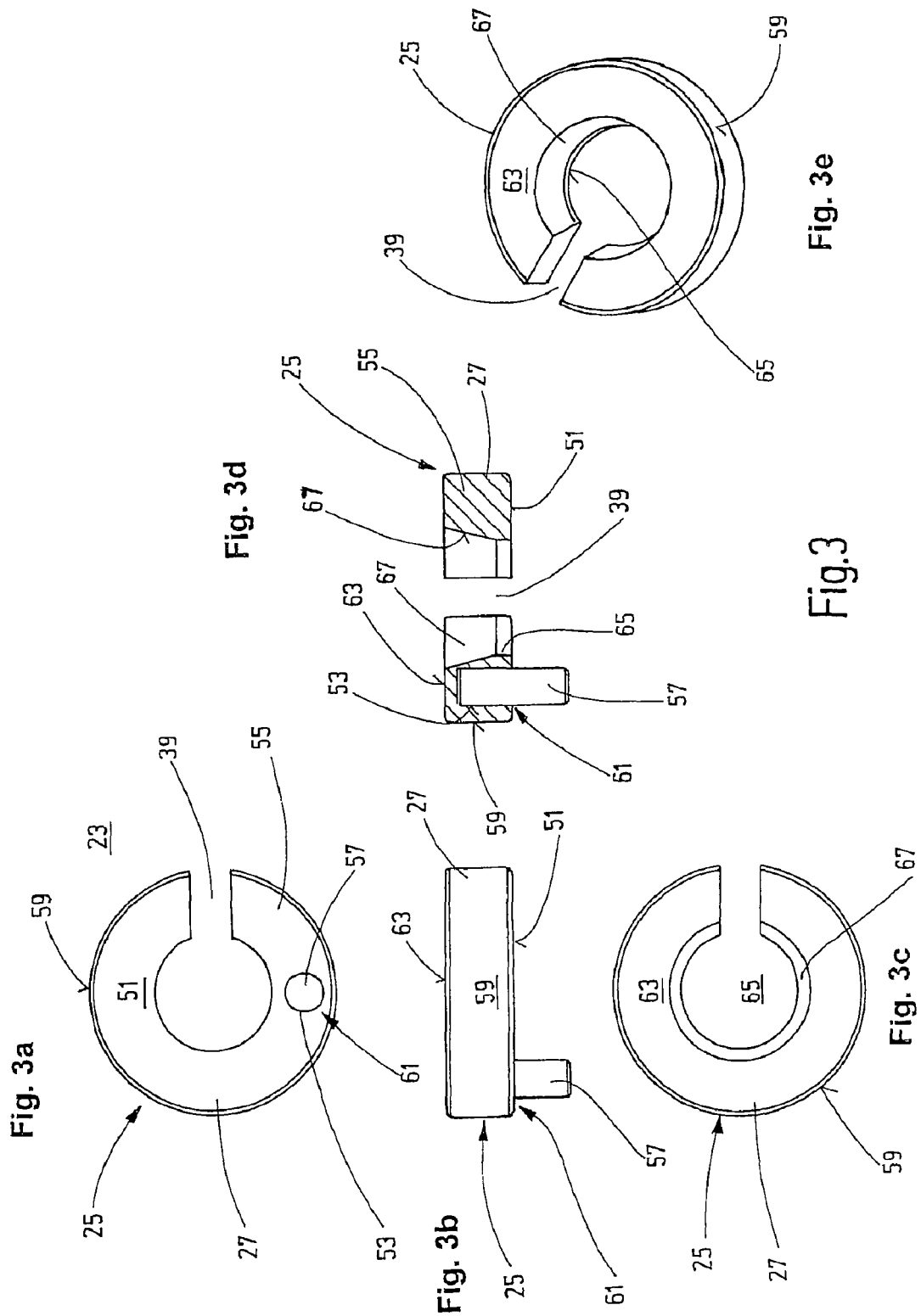
FIG. 3 shows several views of an adjusting device including FIG. 3a, bottom view, FIG. 3b, side view, FIG. 3c, top views.

An adjusting device 23 in FIG. 3 cooperates with the at least one knife plate 9. It has an expandable adjusting element 25 which is preferably designed as a slotted ring 27 which, like the associated knife plate 9, is oriented virtually tangentially with respect to the circumference face 5 of the tool 1. The ring 27 is held on the basic body 11 of the tool 1 by an adjusting screw 29. The screw 29 is likewise oriented here perpendicularly to the mid-axis 19 of the tool 1. The adjusting device 23 is accommodated in a pocket 31 in the basic body 11 of the tool 1. That pocket is delimited outwardly by a wall 33, the outside of which coincides here with the circumferential face 5 of the tool 1. The wall 33 has a perforation 35 which is smaller than the adjusting element 25 of the adjusting device. The element 25 therefore cannot fall outward through the perforation 35 in the radial direction.

The adjusting element 25, designed as a ring 27, of the adjusting device 23 is supported, on the one hand, at the bottom of the pocket 31 and, on the other hand, on a side face 37 of the associated knife plate 9. When the adjusting screw 29 is actuated, that is to say is screwed further into the basic body 11 of the tool 1, the adjusting element 25 is widened, so that the knife plate 9 is displaced here in the axial direction, that is to say perpendicularly to the axis of rotation of the adjusting screw 29, and projects somewhat further out beyond the front side 3 of the tool 1.

Preferably, the adjusting element 25 is provided with a slot 39, so that the expansion of the adjusting element 25 is possible with relatively little effort.

Moreover, the result of designing the adjusting element 25 as a slotted ring 27 is that the durability of the adjusting device 23 is increased: configuring the ring 27 with a slot 39 ensures that the ring 27 does not suffer any fatigue fractures even after several adjusting operations. Furthermore, as stated, the adjusting forces are lower than in the case of a closed ring.

The slot 39 is oriented so that it is preferably arranged on an imaginary circumferential line 41 which runs virtually parallel to the side face 37 of the knife plate 9. This configuration ensures that that half of the ring 27 which faces the knife plate 9 is pivoted in the direction of the knife plate 9 when the adjusting screw 29 is tightened. At the same time, the other half of the ring 27 comes to bear against the bottom of the pocket 31, so that the adjusting element 25 and therefore the ring 27 of the adjusting device 23 are supported reliably.

Accommodating the adjusting device 23 in a pocket 31 ensures that the adjusting element 25 of the adjusting device 23 is held reliably in the basic body 11 of the tool 1 even under high rotational speeds. Moreover, even with the adjusting screw 29 loosened, the adjusting element 25 cannot fall out of the basic body 11 or out of the pocket 31 provided there, should the knife plate 9 be demounted.

Preferably, the knife plate 9 is of polygonal, here square design. If, therefore, a geometrically defined cutting edge 3 projecting beyond the front side 3 of the tool 1 is worn, the knife plate 9 is rotated about an axis standing perpendicularly to its front side 17 and is fastened to the basic body 11 of the tool 1 again. An unused cutting edge is consequently available for machining a workpiece.

As a rule, the tool 1 is set in rotation in order to machine a workpiece. It is rotated in the direction of the arrow 45 reproduced in FIG. 1, that is to say counterclockwise. The cutting edge 43 of the knife plate 9 consequently removes chips from the workpiece to be machined. These are picked up by a chip space 47 into which a coolant/lubricant may also issue. The outflowing medium cools the active cutting edge 43 of the knife plate 9 and makes it easier for the chips entering the chip space 47 to be transported away.

During a rotation of the tool 1 in the direction of the arrow 45, not only are chips removed by the region of the cutting edge 43 which stands beyond the front side 3 of the tool 1. On the contrary, it should be noted that the region 43' of the cutting edge 43 also stands beyond the circumferential face 5 of the tool 1 and removes chips from the workpiece to be machined.

The region 43' of the cutting edge 43 therefore projects beyond the circumferential face 5 of the tool 1 because the knife plate 9 is not inserted tangentially into the circumferential face entirely exactly. It would also be conceivable to make the knife plate 9 thicker in the region 43' of the cutting edge 43 than at the opposite end. In this case, however, the knife plate 9 could not be designed as an indexable insert plate.

Preferably, however, as illustrated, the knife plate 9 is designed with a uniform thickness. Furthermore, the adjusting element 25 of the adjusting device 23 has approximately an identical thickness to the knife plate 9, so that it does not project beyond the latter, but, on the other hand, provides supporting forces essentially over the entire height of the side face 37.

Figure 2:
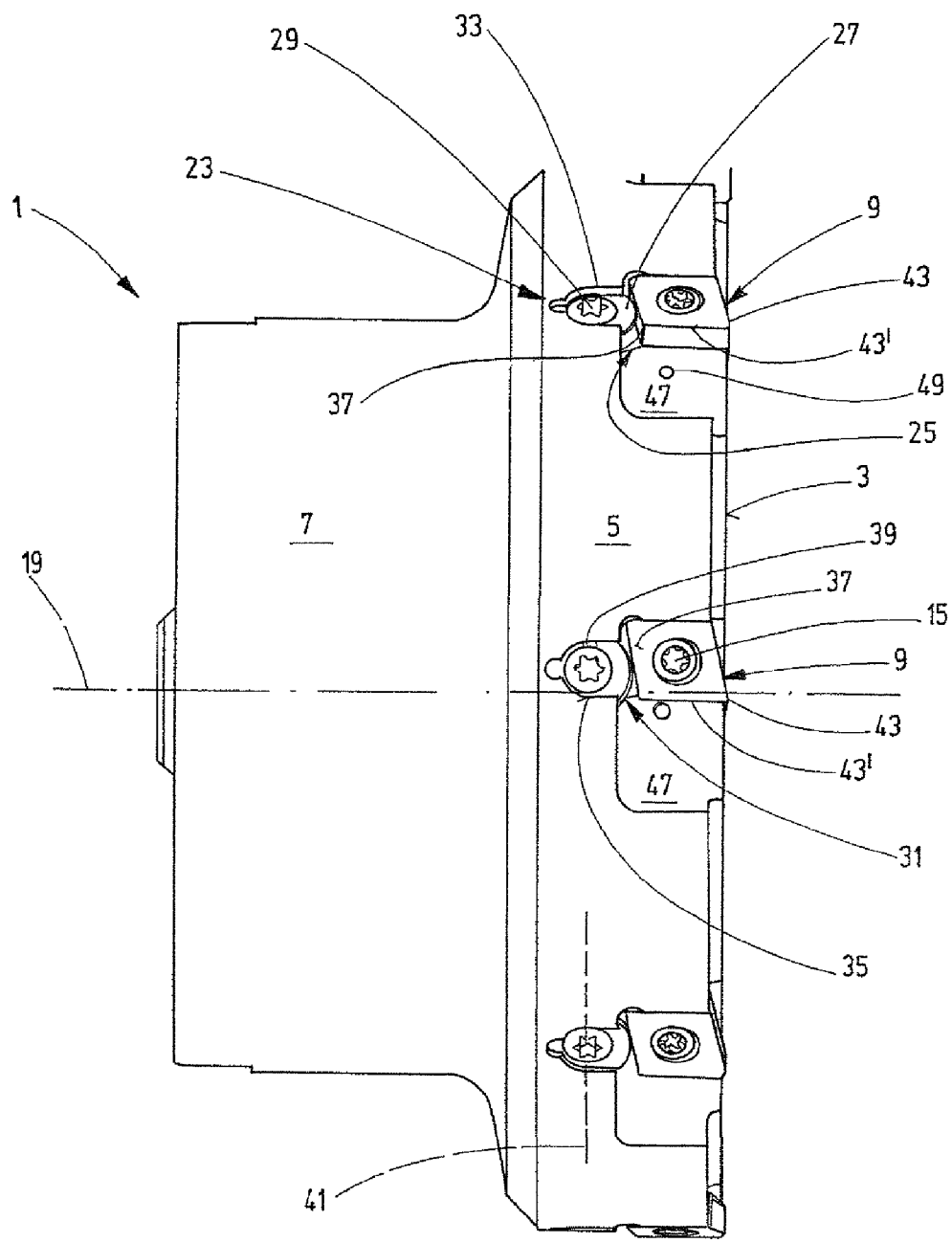
FIG. 2 shows a side view of the chip-removing tool according to FIG. 1.

FIG. 2 shows a side view of the tool 1. Identical parts are given the same reference numerals, and therefore, to that extent, reference is made to the preceding description relating to FIG. 1.

In the illustration according to FIG. 2, it is shown, particularly in the case of the knife plate 9 which is arranged in the vicinity of the mid-line 19 and is reproduced in a top view, that the knife plates 9 do not have a quadratic, but a rhomboid design, the cutting edge 43 projecting beyond the front side 3 of the tool 1 and a region 43' of the cutting edge 43 being oriented essentially parallel to the mid-axis 19 of the tool 1. It becomes clear here, too, that the pocket 31 receives the adjusting device 23 and covers the latter in regions so that it is held reliably even under high centrifugal forces. The adjusting screw 29 can be reached easily via the perforation 35 in the wall 33.

FIG. 3 shows the adjusting element 25 of the adjusting device 23 from several directions including bottom view in FIG. 3a, side view in FIG. 3b, top view in FIG. 3c, cross-section in FIG. 3d and perspective view in FIG. 3e. The underside 51 of the adjusting element 25 designed as the ring 27 can be seen at FIG. 3a. The slot 39, arranged here at "three o'clock" can be seen clearly, which slot makes the expandability of the adjusting element 25, designed as a ring 27, of the adjusting device 23 easier.

The adjusting element 25 lies with the underside 51 on a side face of the pocket 31, and consequently bears against the basic body 11 of the tool 1.

Preferably, there is provision for the slot 39 to be arranged in a defined position, in particular in the region of a circumferential line 41, which can be seen in FIGS. 1 and 2, in order to ensure a directed widening behavior of the adjusting element 25 or of the ring 27.

The desired orientation of the adjusting element 25 of the adjusting device 23 in the basic body 11 of the tool 1 can be achieved in that a pin 57 is inserted into a recess 53 in the adjusting element 25 of the ring 27 and engages into the basic body 11 of the tool 1. Any desired projection on the underside 51 of the adjusting element 25 would have the same function. A projection, a depression or a flattening along an imaginary secant of a circle may also be provided on the circumferential face 59 of the adjusting element 25, in order to prevent an unwanted twisting in the basic body 11 of the tool 1 and consequently in order to implement a positioning device 61.

The adjusting element 25 of the adjusting device 23 is reproduced in a side view FIG. 3b. Identical parts are given the same reference numerals, and therefore, to that extent, reference is made to the preceding description.

The pin 57, projecting beyond the underside 51, of the positioning device 61 can be seen clearly here. It can also be seen that the top side 63 of the ring 27 runs parallel to the underside 51. The thickness of the adjusting element 25, designed as a ring 27, of the adjusting device 23 is selected so that the ring 27 preferably bears with its circumferential face 59, over virtually the entire height, against the side face 37, illustrated in FIGS. 1 and 2, of the knife plate 9.

The bottom view, in FIG. 3c, of the adjusting element 25, designed as a ring 27, of the adjusting device shows that the central orifice 65 of the ring 27 is surrounded by a conical region 67 which descends from the top side 63 toward the orifice 65.

The adjusting element 25, designed as a ring 27, of the adjusting device 23 is illustrated in section in FIG. 3d, the sectional line being led along a diametral line which runs through the pin 57 of the positioning device 61. It can be seen clearly that the pin 57 is inserted into a recess 53 in the adjusting element 25 and projects beyond the underside 51 of the ring 27 in order to engage into the basic body 11 of the tool 1.

As explained by the top view FIG. 3c, the central through orifice 65 is provided with a curved or conical region 67. An outer cone of an adjusting screw 29, not illustrated here, can engage on this inner cone in order to widen the adjusting element 25. Since the latter is designed here as a slotted ring 27, a widening of the ring 27 is possible without especially high forces, and therefore the adjusting device 23 can be set with high sensitivity.

Finally, the adjusting element 25 of the adjusting device 23 is also reproduced in the perspective illustration in FIG. 3e. The top side 63 is shown here. The central orifice 25, with the conical region 37 forming the inner cone, and the slot 39 can be seen clearly. Identical parts are given the same reference numerals, and therefore, to that extent, reference is made to the preceding description.

In the perspective illustration, the pin 57 of the positioning device 61 is concealed and is therefore invisible.

Figure 4:
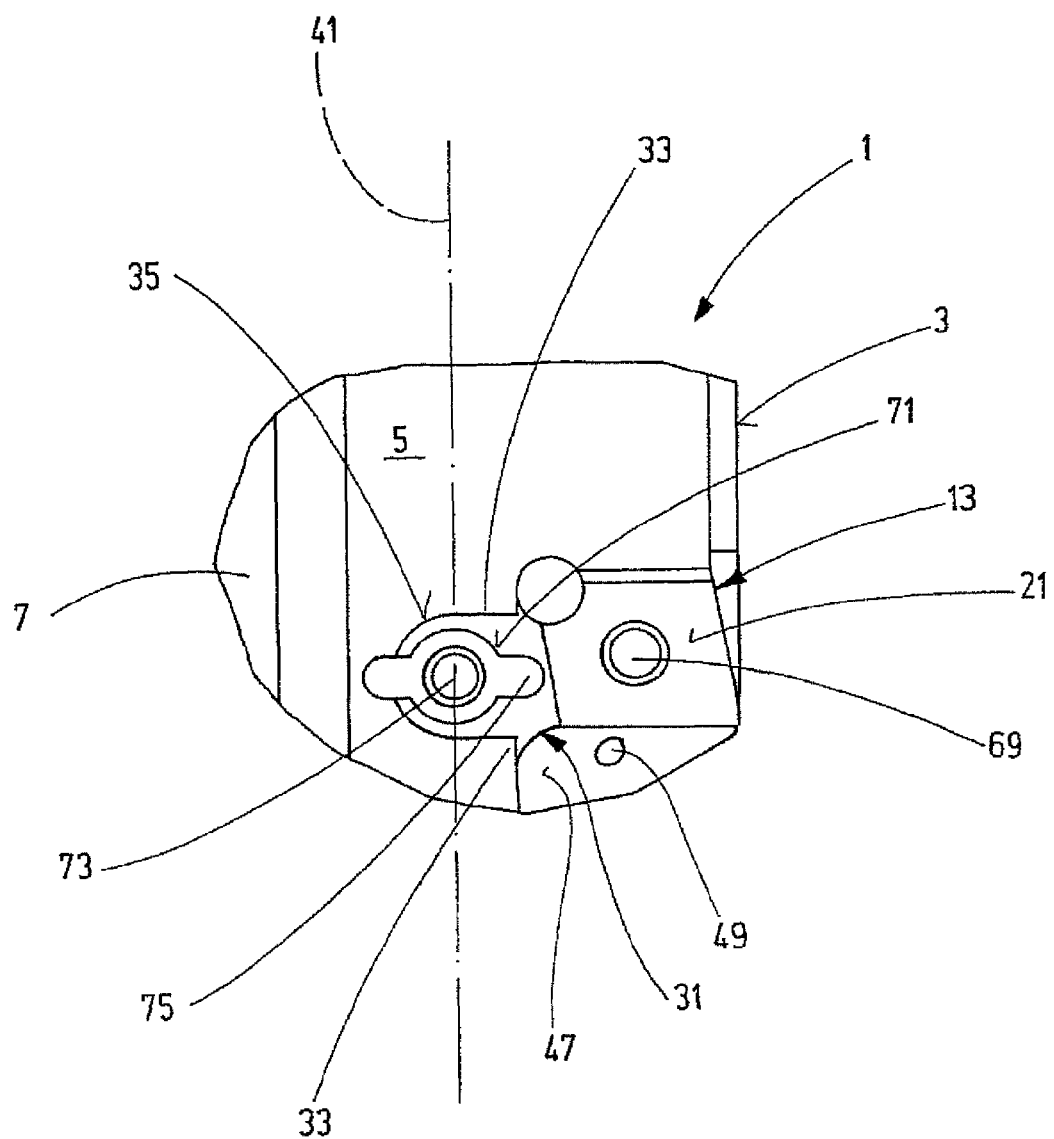
FIG. 4 shows a detail of the chip-removing tool according to FIGS. 1 and 2 without a knife plate and without an adjusting device.

Finally, FIG. 4 shows a part view of the tool 1 in a side view. This could relate here to the region near the mid-line 19 in FIG. 2. Here, however, the knife plate 9, the tension screw 15, the adjusting device 23 with the adjusting element 25, designed as a ring 27, and the adjusting screw 29 are not reproduced. What can be seen clearly here is the base 21 of the recess 13 receiving the knife plate 9, on which base the underside, lying opposite the front side 17, of the knife plate 9 lies. The base 21 is perforated by a recess 69 provided with an internal thread, into which the tension screw 15, not reproduced here, engages.

The pocket 31 which receives the adjusting device 23 can be seen correspondingly. The adjusting element of the latter lies on an underside 71 of the pocket 31 which has a recess 73 which is provided with an internal thread and into which the adjusting screw 29 of the adjusting device 23 engages.

Introduced into the underside 71 is a slot 75 running horizontally here. It runs in the direction in which the adjusting device 23 is pushed into the pocket 31. The slot 75 extends as far as the base 21. It is therefore possible, with the knife plate 9 demounted, to lay the adjusting element 25, designed as a ring 27, of the adjusting device 23 onto the underside 71 so that the pin 57 engages into the slot 75. The adjusting device 23 can then be pushed into the pocket 31 along an imaginary straight line on which the slot 75 lies. By means of the slot 75, after the adjusting screw 29 has been introduced, a rotation of the adjusting element 25 designed as a ring 27 about the adjusting screw 29 is prevented, and therefore the slot 39 in the ring 27 can be arranged and held in a predetermined position.

In the tool 1 described here, there is provision for the slot 39 to be arranged approximately on a circumferential line 41, so that, when the adjusting screw 29 is actuated, a first half of the adjusting element 25 designed as a ring 27 is pivoted in the direction of the knife plate 9, while a second half is supported on the bottom of the pocket 31, thus ensuring that the adjusting screw 29 is not bent out of its central orientation with respect to the recess 73.

The illustration according to FIG. 4 also shows that the underside 21 of the pocket 31 is spanned in regions by the wall 33, so that the adjusting device 23 is held reliably in the pocket 31 even under high rotational speeds. The perforation 35 ensures that the adjusting screw 29 of the adjusting device 23 can easily be reached and actuated even with the adjusting element 25 inserted.

Moreover, it is shown that the adjusting element 25 of the adjusting device 23 may be designed to be very flat. It may also be designed to be thinner than the knife plate 9 or else to have an identical thickness to the latter, so that adjusting forces are introduced into the side face 27 of the knife plate 9 virtually over the entire height of the knife plate 9.

Moreover, the adjusting device 23 is very small and light. It can therefore be accommodated in a small pocket 31, so that the basic body 11 of the tool 1 is not unnecessarily weakened.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

The invention claimed is:
1. A chip-removing tool, comprising
a basic body,
at least one cutting body which is attachable to the basic body, the cutting body has at least one geometrically defined cutting edge, and
an adjusting device including an adjusting element which is expandable;
an adjusting screw configured for operating on the adjusting element for causing the adjusting element to expand, the adjusting element configured as a ring which is supported, on the one hand, on the cutting body and, on the other hand, on the basic body of the chip-removing tool.
2. A chip-removing tool as claimed in claim 1, wherein the ring has a slot in it which enables the ring to be expanded.
3. The chip-removing tool as claimed in claim 1, wherein the cutting body is configured as a knife plate.
4. The chip-removing tool as claimed in claim 2, wherein the adjusting element has a thickness, measured in the direction of its mid-axis which is smaller than or equal to the thickness of the cutting body.
5. The chip-removing tool as claimed in claim 1, further comprising a positioning device with which the adjusting device cooperates.
6. The chip-removing tool as claimed in claim 5, wherein the positioning device has a projection configured to prevent relative movement of the adjusting device with respect to the basic body of the chip-removing tool in a specific direction.
7. The chip-removing tool as claimed in claim 6, wherein the projection and the adjusting device are configured such that the projection can be inserted into the adjusting element of the adjusting device.
8. The chip-removing tool as claimed in claim 7, further comprising the basic body of the chip-removing tool having a slot in which the projection engages.
9. The chip-removing tool as claimed in claim 2, wherein the adjusting element of the ring has a region which is offset with respect to the slot by approximately 90° into which the projection is configured to be inserted.
10. The chip-removing tool as claimed in claim 1, further comprising a pocket which is introduced into the basic body of the chip-removing tool and which opens in the direction of the cutting body and the adjusting device is configured to be inserted in to the pocket.
11. The chip-removing tool as claimed in claim 10, wherein the pocket is delimited by a wall, the wall having an outside which coincides with a circumferential face of the chip-removing tool.
12. The chip-removing tool as claimed in claim 11, wherein the wall has a perforation configured such that an adjusting screw can be inserted into the basic body of the chip-removing tool and can be actuated.
13. The chip-removing tool as claimed in claim 1, wherein the adjusting screw passes through the ring of the adjusting device.
14. The chip-removing tool as claimed in claim 13, wherein an axis of rotation of the adjusting screw runs concentrically with respect to a mid-axis of the ring.
15. The chip-removing tool as claimed in claim 1, wherein the adjusting screw and the adjusting element of the adjusting device form a wedge mechanism.
16. The chip-removing tool as claimed in claim 15, wherein at least one of the adjusting screw and the ring has a wedge face, and on the one hand has an inner cone and, on the other hand, has an outer cone which engages into the inner cone being provided.
17. The chip-removing tool as claimed in claim 6, wherein the projection comprises a pin.

* * * * *